(12) United States Patent
Jalkanen et al.

(10) Patent No.: US 10,812,454 B2
(45) Date of Patent: Oct. 20, 2020

(54) METHODS AND APPARATUSES FOR PROVIDING SECURITY IN A ROAMING ENVIRONMENT

(71) Applicant: Telia Company AB, Solna (SE)

(72) Inventors: Tero Jalkanen, Tuusula (FI); Tomi Sarajisto, Helsinki (FI); Ilkka Keisala, Espoo (FI)

(73) Assignee: TELIA COMPANY AB (SE)

( * ) Notice: Subject to any disclaimer, the term of this patent is extended or adjusted under 35 U.S.C. 154(b) by 233 days.

(21) Appl. No.: 15/897,768

(22) Filed: Feb. 15, 2018

(65) Prior Publication Data

US 2018/0234395 A1   Aug. 16, 2018

(30) Foreign Application Priority Data

Feb. 16, 2017 (EP) .................................. 17156506

(51) Int. Cl.
*H04L 29/06* (2006.01)
*H04L 12/46* (2006.01)
(Continued)

(52) U.S. Cl.
CPC ...... *H04L 63/0428* (2013.01); *H04L 12/4633* (2013.01); *H04L 12/4641* (2013.01);
(Continued)

(58) Field of Classification Search
CPC ..... H04W 40/00; H04W 40/26; H04W 40/04; H04W 40/20; H04W 40/34; H04W 40/36;
(Continued)

(56) References Cited

U.S. PATENT DOCUMENTS 8,520,615 B2    8/2013  Mehta et al.
9,591,434 B1 *  3/2017  Cordes ................. H04W 12/06
(Continued)

OTHER PUBLICATIONS

"3rd Generation Partnership Project; Technical Specification Group Services and System Aspects; System improvements for Machine-Type Communications (MTC) ( Release 11)", 3 GPP Draft; 23888-B00, 3RD Generation Partnership Project (3GPP), Mobile Competence Centre; 650, Route Des Lucioles; 7-06921 Sophia-Antipolis Cedex; France, Sep. 18, 2012 (Sep. 18, 2012), XP050905493, retrieved from the Internet: URL:http://www.3gpp.org/ftp/Specs/ 2014-12/Rel-11/23_series/ [retrieved on Sep. 18, 2012], pp. 27-29; table 5.3.3.1.

(Continued)

*Primary Examiner* — Lynn D Feild
*Assistant Examiner* — Richard A McCoy
(74) *Attorney, Agent, or Firm* — Burr & Forman LLP; Jeffrey H. Kamenetsky (57) ABSTRACT

The embodiments herein relate to an IoT device, a method performed in the IoT device, a network device and a method performed in the network device for securing communication of the IoT device roaming from a home network to a visited network. The method comprising: receiving a request from the IoT device to set up a VPN tunnel; acknowledging the setting up of the VPN tunnel, and routing data received from the IoT device destined for an IoT service provider via the VPN tunnel. This way the encryption/decryption processes are handled by the visited network.

9 Claims, 7 Drawing Sheets

(51) Int. Cl.
  *H04W 76/12* (2018.01)
  *H04W 4/70* (2018.01)
  *H04W 8/12* (2009.01)
  *H04W 12/00* (2009.01)

(52) U.S. Cl.
  CPC ...... *H04L 63/0272* (2013.01); *H04L 63/0869* (2013.01); *H04W 4/70* (2018.02); *H04W 8/12* (2013.01); *H04W 12/0013* (2019.01); *H04W 76/12* (2018.02)

(58) Field of Classification Search
  CPC ....... H04W 40/38; H04W 36/22; H04W 4/70; H04L 12/4633; H04L 67/12; H04L 63/20; H04L 63/205; H04L 63/272
  See application file for complete search history.

(56) References Cited

U.S. PATENT DOCUMENTS

| | | | | |
|---|---|---|---|---|
| 9,686,238 | B1* | 6/2017 | Row, II | H04L 63/0272 |
| 9,788,188 | B2 | 10/2017 | Xu et al. | |
| 2006/0191005 | A1* | 8/2006 | Muhamed | H04W 28/16 726/15 |
| 2011/0235595 | A1 | 9/2011 | Mehta et al. | |
| 2011/0310842 | A1* | 12/2011 | Eisl | H04W 36/0072 370/331 |
| 2014/0169286 | A1 | 6/2014 | Xu et al. | |
| 2015/0358325 | A1* | 12/2015 | Zhang | H04L 47/122 726/7 |
| 2016/0234681 | A1* | 8/2016 | Swissa | H04W 8/26 |
| 2017/0230832 | A1* | 8/2017 | Ophir | H04W 4/70 |
| 2017/0237719 | A1* | 8/2017 | Schwartz | G06F 21/602 713/153 |
| 2018/0063079 | A1* | 3/2018 | Ding | H04L 12/2854 |
| 2018/0092140 | A1* | 3/2018 | Dong | H04W 76/22 |
| 2018/0115611 | A1* | 4/2018 | Lear | H04L 67/125 |
| 2018/0213461 | A1* | 7/2018 | Grayson | H04L 45/24 |

OTHER PUBLICATIONS

European Search Report, App. No. 17156506.2-1862, dated Apr. 19, 2017, pp. 1-10, European Patent Office, Munich, Germany.

* cited by examiner

FIGURE 1

METHODS AND APPARATUSES FOR PROVIDING SECURITY IN A ROAMING ENVIRONMENT

TECHNICAL FIELD

The present disclosure relates to the field of secure data communications, and in particular to a method performed by an IoT (Internet-of-Things) device and an IoT device allowing secure transmission of data in a roaming environment traversing, e.g., the public Internet. The present disclosure also relates to a method in a network device and a network device in said roaming environment for enabling secure transmission and/or reception of data to/from the IoT device.

BACKGROUND

In many cases Low Power Wide Area (LPWA) IoT devices are developed with very low computing power as a complex system is not considered to perform most IoT tasks. Example of such an IoT device is a sensor device such as a temperature sensor or a tracking device or a metering device etc. with the capability to connect to the Internet. Many IoT devices comprise a microcontroller, sensors and SIM modules for wireless communications, making it difficult to implement robust device encryption/decryption Virtual Private Network (VPN) tunnel such as Internet Protocol security (IPsec). Therefore, when an IoT device communicates over the public Internet, the data transmitted is unencrypted which is easily susceptible to attackers or hackers especially due to ever-increasing security threats taking place over the Internet.

Further, IoT traffic taking place over the Internet in a roaming scenario is expected to be popular because of very low cost involved when compared to the more traditional way of routing traffic from a visited network to the home network via the secured GRX/IPX connection. GRX stands for GPRS Roaming Exchange and IPX for Internet Protocol eXchange network. GRX/IPX include roaming and signaling services. In general IPX includes GRX. IPX offers security of a network with class of service completely separate from the open public Internet.

As previously described, one solution to secure communication of an IoT device in a roaming scenario is to increase the processing capacity of the IoT device so that the IoT device itself creates the VPN tunnel towards the destination. However, this will be contrary to the concept of IoT, e.g., LPWA IoT or NB-IoT where devices should be simple and cost effective. Since the estimated number of IoT devices to be developed is expected to be several billions, there is a balance between complexity of the device and costs.

There is therefore a need for a solution that is reliable and cost-efficient and that allows IoT devices to be provided with a secure transmission or reception of data in a roaming environment traversing, e.g., the public Internet.

SUMMARY

It is an object of embodiments herein to solve the above problems by providing a method performed in an IoT device, an IoT device, a method performed by a network device and a network device for achieving secure transmission and/or reception of data in a roaming environment traversing, e.g., the Internet.

According to an aspect of embodiments herein, there is provided a method performed in an IoT device roaming from a home network to a visited network, the method comprising: sending a request to a network device of the visited network, to set up a VPN tunnel between the IoT device and a gateway device of a IoT service provider; receiving from the network device of the visited network an acknowledgement confirming the setting up of the VPN tunnel; setting up an Internet Protocol (IP) connection towards the IoT service provider; and sending and/or receiving to or from the IoT service provider data, wherein said data is routed via at least the VPN tunnel set up by the network device of the visited network.

According to another aspect of embodiments herein, there is provided a method performed in a network device of a visited network to which an IoT device is roaming from a home network, the method comprising: receiving a request from the IoT device to set up a VPN tunnel between the network device and a gateway device of an IoT service provider; setting up the VPN tunnel; sending an acknowledgment to the IoT device confirming the setting up of the VPN tunnel; routing data received from the IoT device destined to the IoT service provider via at least the VPN tunnel; and transmitting, to the IoT device, data received from the IoT service provider via the VPN tunnel.

According to another aspect of embodiments herein, there is provider an IoT device roaming from a home network to a visited network, the IoT device being configured to: send a request to a gateway device of the visited network, to set up a VPN tunnel between the IoT device and a gateway device of a IoT service provider; receive from the gateway device of the visited network an acknowledgement confirming the setting up of the VPN tunnel; set up an IP connection towards the IoT service provider; and send and/or receive to or from the IoT service provider data, wherein said data is routed via at least the VPN tunnel set up by the gateway device of the visited network.

According to another aspect of embodiments herein, there is provided a gateway device of a visited network to which an IoT device is roaming from a home network; the gateway device being configured to: receive a request from the IoT device to set up a VPN tunnel between the gateway device and a gateway device of a IoT service provider; set up the VPN tunnel; send an acknowledgment to the IoT device confirming the setting up of the VPN tunnel; route data received from the IoT device destined to the IoT service provider via at least the VPN tunnel; and transmit to the IoT device, data received from the IoT service provider via the at least said VPN tunnel An advantage with embodiments herein is that all traffic from the IoT device or from the IoT service provider is provided with reliable encryption, thanks to the created VPN, before it is sent over the public Internet.

Another advantage herein is that this process is completely transparent to the IoT device and hence does not require special hardware on the IoT device.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
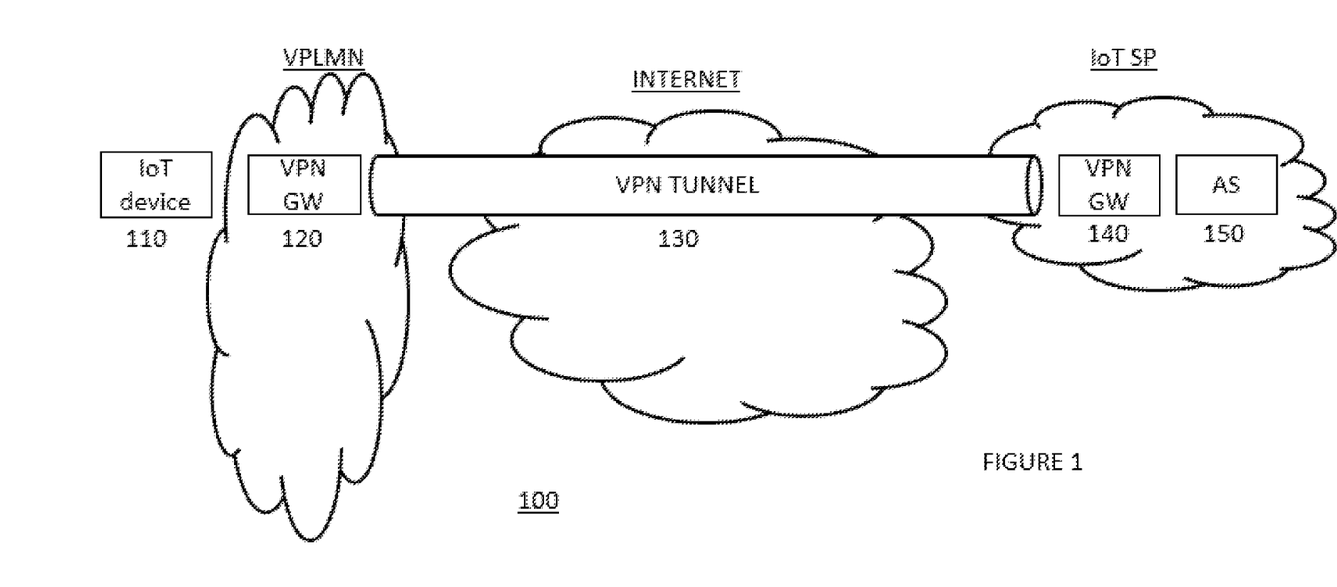
FIG. 1 is an example scenario wherein embodiments of the present invention may be employed.

Referring to FIG. 1, there is illustrated an example of a network scenario 100 wherein embodiments herein may be employed.

It is here assumed that the IoT device 110 has for some reason moved from a home network also known as a HPLMN (Home Public Land Mobile Network), to a visited network or Visited PLMN (VPLMN). As an example, the IoT device 110 may be a tracking device or a sensor which is a Low Power Wide Area (LPWA) device or a Narrow Band (NB)-IoT device. As previously described, an IoT device, in many cases, is a simple device developed with (very) low computing power, making it difficult to implement robust device encryption/decryption Virtual Private Network (VPN) tunnel such as Internet Protocol security (IPsec).

According to embodiments herein, the task of encryption/decryption processes using VPN IPsec is instead moved to the mobile network of the VPLMN to which the IoT device is roaming. It is here a pre-requisite that the HPLMN and the VPLMN have a roaming agreement so that the IoT device 110 trusts the VPLMN.

As shown in FIG. 1 and according to embodiments herein, the VPLMN comprises a VPN gateway (GVV) 120 which upon request from the roaming IoT device 110 sets up a VPN tunnel 130 for securing traffic to or from the IoT device 110. Without the VPN tunnel 130, the traffic would instead be sent or received in plain text over the Internet, i.e., unencrypted.

The VPN GW 120 acknowledges the setting up of the VPN tunnel 130 between GW 120 and the VPN GW 140 of an IoT Service Provider (SP). The IoT ISP comprises an Application Server 150 that hosts the actual IoT application or service.

An example of a VPN tunnel is IPsec VPN tunnel. IPsec is a protocol suite for securing IP traffic by authenticating and encrypting each IP data packet of the traffic. IPsec also includes protocols for establishing mutual authentication between agents at the beginning of a session and negotiation of cryptographic keys to be used during the session. IPsec operates in the Internet layer of the IP suite. Hence all traffic passing the Internet is protected. IPsec is advantageously used when dealing with data of a sensitive nature such as the transfer of personal identification information.

When the VPN GW 120 of the VPLMN confirms to the IoT device 110 of the setting up of the VPN tunnel between the VPN GW 120 and the VPN GW 140 of the IoT SP, the IoT device 110 sets up an IP connection towards the IoT SP (e.g., AS 150).

The VPLMN hence ensures that traffic to or from the IoT device 110 gets routed via the VPN tunnel connection established between the GWs 120 and 140. A de-attach request may be sent by the IoT device 110 to the VPLMN (or VPN GW 120) in order to terminate the session.

It should be mentioned that the VPN GWs described herein may also support for example TLS (Transport Layer Security), which can be used to create a VPN tunnel. The embodiments herein are therefore not restricted to any specific security protocol.

Figure 2:
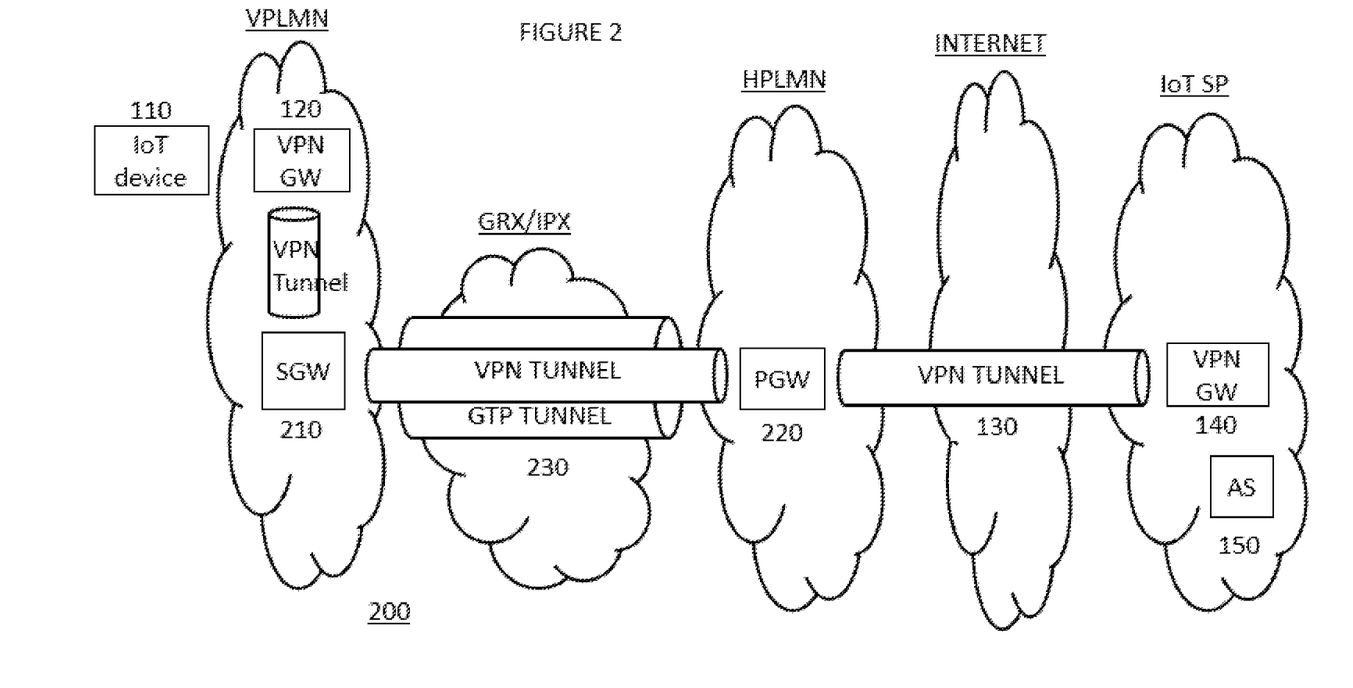
FIG. 2 is another example scenario wherein embodiments of the present invention may be employed.

Referring to FIG. 2 there is illustrated another example of a network scenario 200 wherein embodiments herein may be employed.

As shown, the VPLMN further includes a Serving GW (SGVV) 210. The HPLMN is also shown including a PDN GW or PGW 220. According to this embodiment, the traffic from the IoT device 110 is routed back to the HPLMN before being routed, over the Internet, to the IoT service provider. The encryption/decryption processes using VPN or IPsec tunneling is handled just like in the previous scenario, i.e., using the VPLMN. The only difference is that the created VPN tunnel ends up inside a GTP tunnel 230 as shown in FIG. 2. The GTP tunnel is a standardized Third Generation Partnership Project (3GPP) security feature. The GTP tunnel is created between the SGW 210 of the VPLMN and the PGW 220 of the HPLMN when using home routed roaming (for example in Long Term Evolution Data roaming). GTP is a group of IP based communications protocols used to carry General packet Radio Service (GPRS) within GSM, UMTS and LTE networks. GTP stands for GPRS Tunneling Protocol.

The GRX/IPX network wherein the GTP tunnel is created includes roaming and signaling services. As shown, the GRX/IPX network where the GTP tunnel is created is separate from the Internet and thus secure. The interface between SGW 210 of the VPLMN and PGW 220 of the HPLMN is known as the S8 interface.

The VPN tunnel initially is created in the VPLMN between the VPN GW 120 and the SGW 210 which is then further protected in the GTP tunnel 230. The traffic is then routed from the PGW 220 of the HPLMN using VPN tunneling before reaching the destination IoT SP (or VPN GW 140) as previously described. Even though the VPN or IPsec tunneling as described in scenario 1 is enough when dealing with data of a sensitive nature, the additional GTP tunneling might be needed when the IoT device is sending especially sensitive data that the IoT SP does not want to present even for the IPX carrier.

It should be mentioned that instead of the SGW-PGW route, i.e., the S8 interface, the T6a interface may instead be used. The T6a interface is used between the IWK-SCEF of the VPLMN and the SCEF of the HPLMN. IWK-SCEF is the InterWorKing (IWK)—Service Capability Exposure Function (SCEF) which may replace or complement the SGW of the VPLMN. The SCEF of the HPLMN may replace or complement the PGW of the HPLMN. The type of interface to use may depend on whether the IoT device in question is a NB-IoT device or a LTE-Machine type communication device (LTE-M). LTE-M supports IoT through lower device complexity and provides extended coverage, while allowing the use of LTE. NB-IoT is a narrowband radio technology designed for IoT. NB-IoT device is also a low power wide area technology.

The embodiments of the present invention are therefore also applicable for the home routed scenario over the IPX between IWK-SCEF in VPLMN and SCEF in HPLMN, depending upon the type of IoT used and also depending on whether the device is using control plane or user plane.

Figure 3:
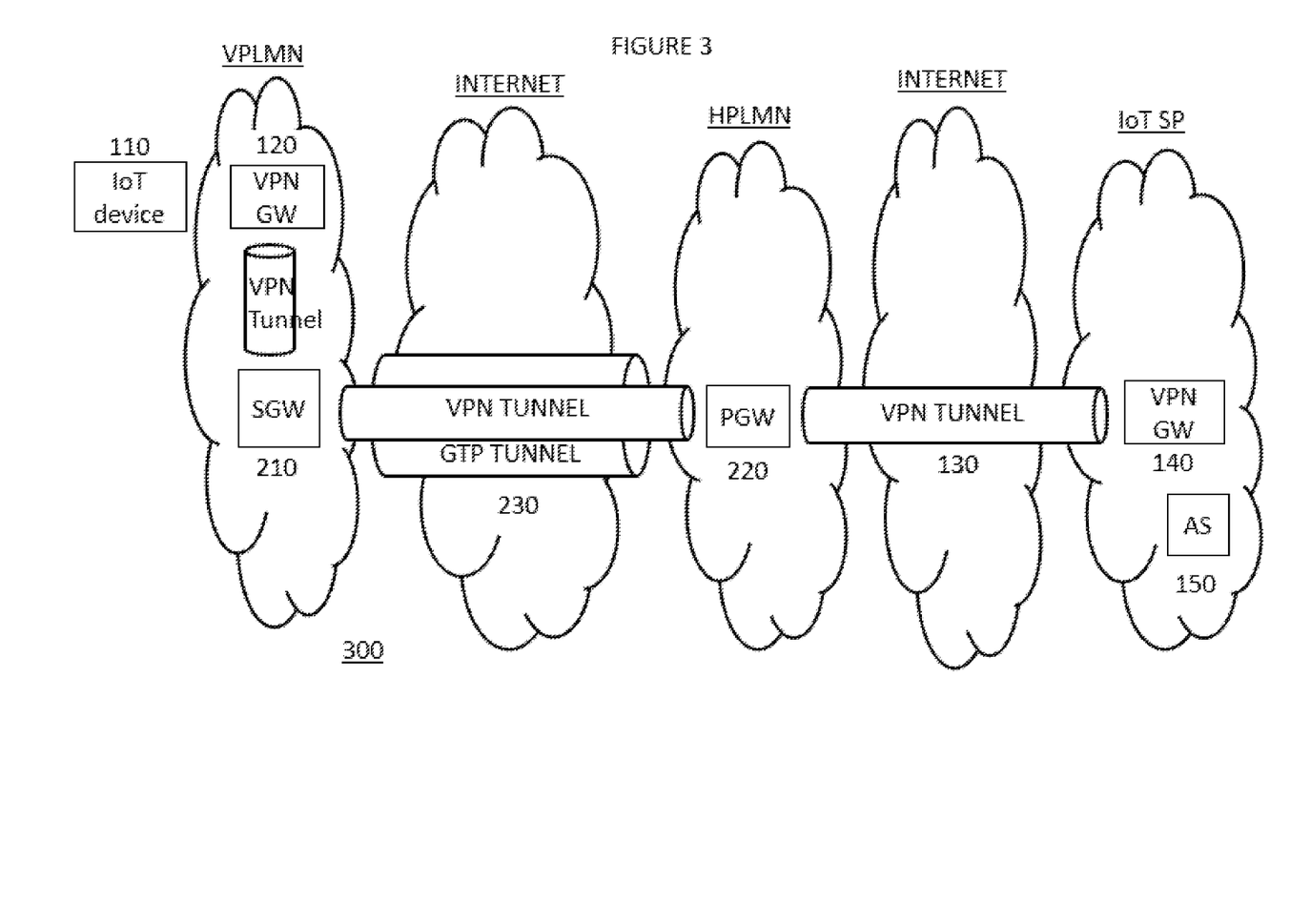
FIG. 3 is another example scenario wherein embodiments of the present invention may be employed.

Referring to FIG. 3, there is illustrated yet another example of a network scenario 300 wherein embodiments herein may be employed. The difference between scenario 200 of FIG. 2 and scenario 300 of FIG. 3 is that the Internet network is used as a bearer network for the GTP tunnel 230 created between the SGW 210 of the VPLMN and the PGW 220 of the HPLMN. The traffic would be run like in the normal GRX case (FIG. 2) between the SGW 210 and the PGW 220 but the bearer network is the Internet. This is somewhat less secure than in the scenario of FIG. 2 but the cost for an IoT service is less. Hence the transport layer is different but the solution works just like in the model over the GRX/IPX network. FIG. 3 shows two Internet networks, however, this is simply to show that the bearer of the GTP tunnel (including the VPN tunnel) is the Internet. It should be mentioned that even though security is reduced compared to the scenario where the GRX/IPX is the bearer of the GTP tunnel, the GTP tunnel still provides enhanced security of the created VPN tunnel when the bearer is the Internet. In all scenarios of the present invention, security is achieved, but at different security levels, when comparing with the prior art where the information transmitted from an IoT device to the application server of an IoT service provider is transmitted in plain text, i.e., unprotected and therefore easily susceptible to attackers or hackers.

Figure 4:
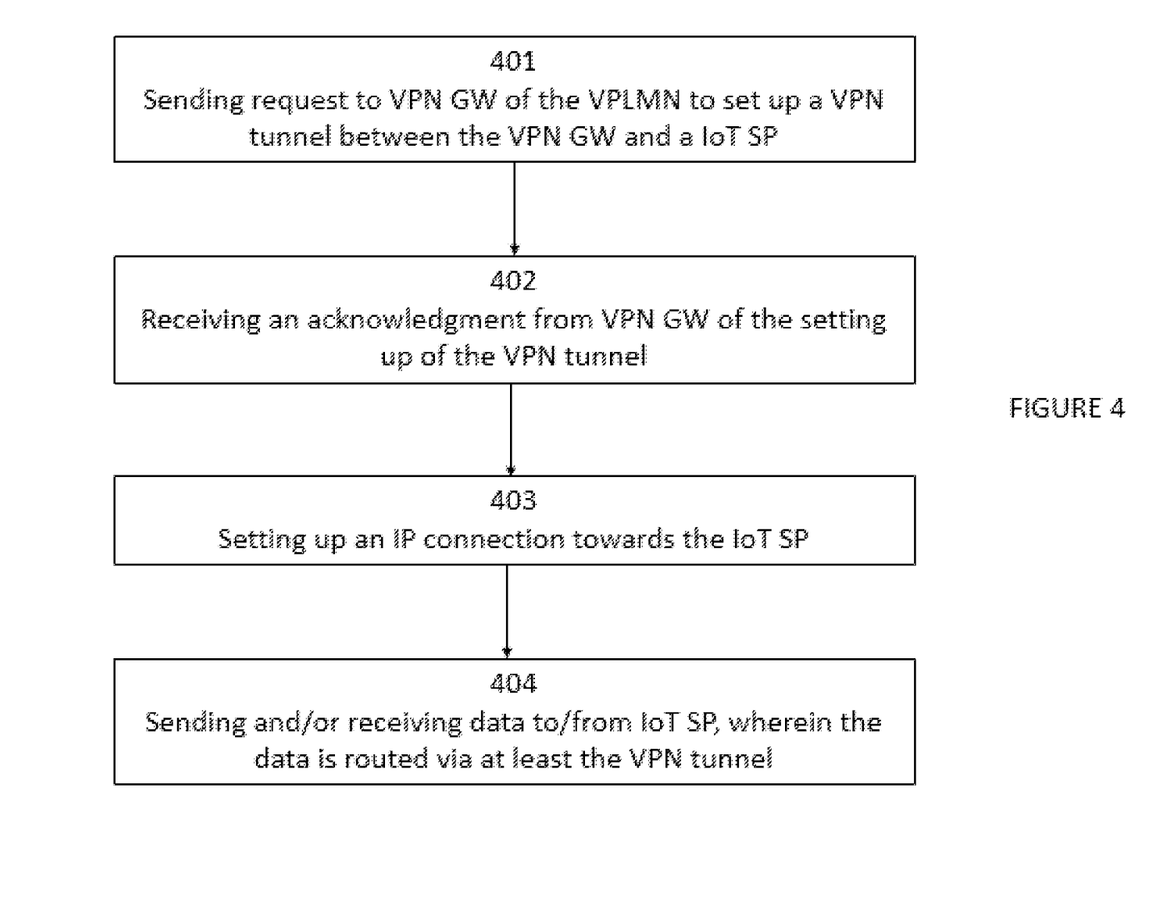
FIG. 4 illustrates a flowchart of a method performed by an IoT device according to exemplary embodiments herein.

Referring to FIG. 4 there is illustrated a flowchart summarizing the main actions of a method performed in an IoT device in accordance with the previously described embodiments. The IoT device is roaming from a home network (HPLMN) to a visited network (VPLMN). As shown, the method comprises:

(401) sending a request to a network device 120 or gateway device 120 of the visited network to set up a VPN tunnel 130 between the gateway device 120 and a gateway 140 of the IoT service provider;

(402) receiving an acknowledgement from the network device or gateway device 120 of the visited network confirming the setting up of the VPN tunnel 130;

(403) setting up an IP connection towards the IoT service provider (or the gateway device 140 of the IoT service provider); and (404) sending and/or receiving data to or from the IoT service provider (or an application server 150 of the IoT service provider), wherein the data is routed via at least the VPN tunnel 130.

According to an embodiment, the IP packets of the data routed via said at least VPN tunnel 130 are protected using IPsec, wherein the protection includes encryption and/or decryption processes.

According to another embodiment, and as previously described, the data routed via the VPN tunnel may further be tunneled over a GTP tunnel 230 created between a serving gateway 210 of the visited network and a packet data network gateway 220 of the home network. The network over which the GTP tunnel is created maybe the GRX/IPX or the Internet.

An advantage with the embodiments described above is that all traffic from the IoT device or from the IoT service provider is provided with reliable security (encryption), thanks to the created VPN, before it is sent over the public Internet to the IoT SP.

Another advantage herein is that the encryption/decryption process is transparent to the IoT device as it is handled by the VPLMN. The IoT device therefore does not require special hardware or complex implementation. The IoT device however needs to trust the VPLMN and also there is a roaming agreement between the VPLMN and the HPLMN.

Figure 5:
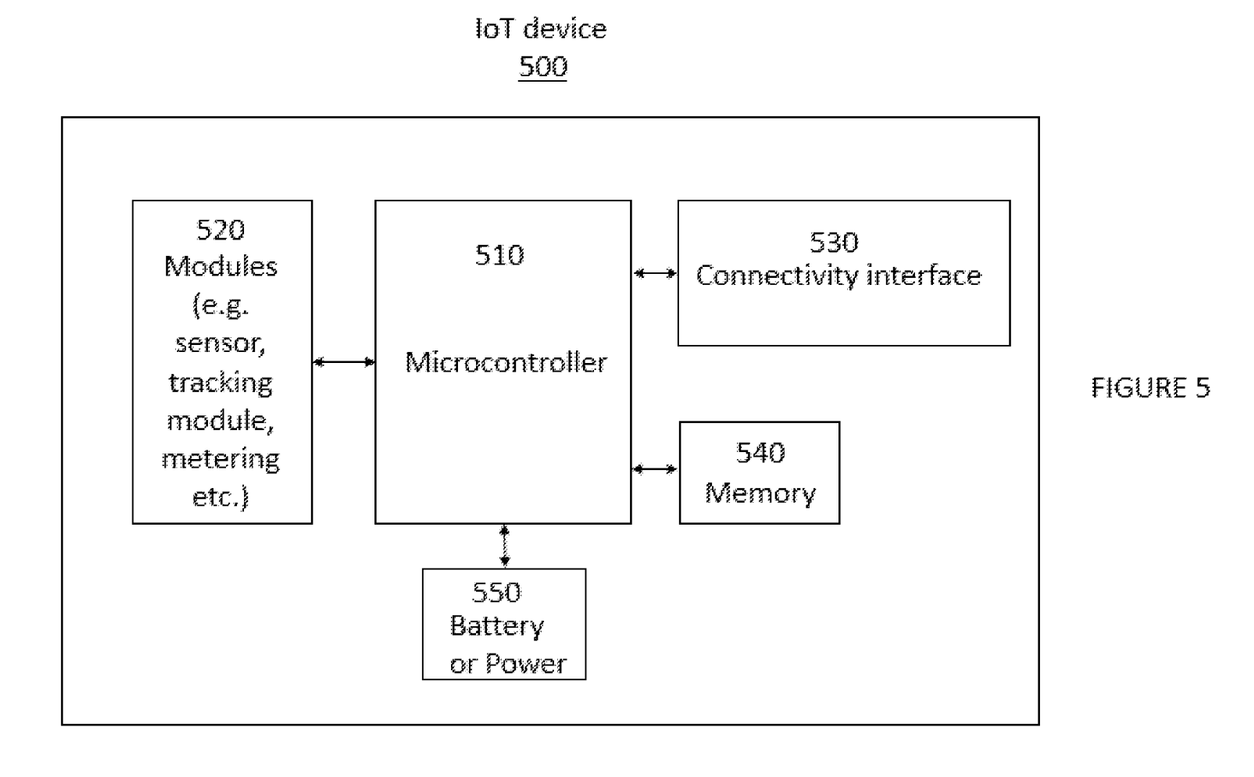
FIG. 5 illustrates a block diagram of an IoT device according to embodiments herein.

Referring to FIG. 5 there is illustrated an exemplary block diagram of an IoT device 500 according to exemplary embodiments herein. The IoT device 500 may be a sensor device, a tracking device, a metering device, an opto device, an environmental device or any type of IoT device. As shown, the IoT device 500 comprises a microcontroller 510, e.g., a microprocessor; a connectivity interface 530 which may include an interface for wireless communication (Bluetooth, WLAN, GSM, UMTS, LTE, etc.) and/or wired communication etc.; a memory module 540 and a sensor module or tracking module, etc. 520. The IoT device 500 is also shown comprising a battery management module or a power management module 550. Additional components may also be included such as a display, etc. The IoT device 500 may be a NB-IoT, a LPWA device, a LTE-M device or any type of device that supports IoT technology.

The microcontroller 510 controls the operation of the IoT device 500 and its components. Memory (circuit or module) 540 may include a random access memory (RAM), a read only memory (ROM), and/or another type of memory to store data and instructions that may be used by microcontroller 510.

The IoT device 500 is configured to send by means of a communication interface or connectivity interface 530, a request to a gateway device of a visited network requesting the gateway to set up a VPN tunnel between the gateway device and a gateway device of an IoT service provider. The IoT device 500 is further configured to receive an acknowledgement from the gateway device of the visited network of the setting up of the VPN tunnel. The IoT device 500 is further configured to set up an IP connection towards the gateway of the IoT SP and to send/receive data to or from the IoT service provider, wherein the data is routed via at least the VPN tunnel. Additional details have already been described herein.

Figure 6:
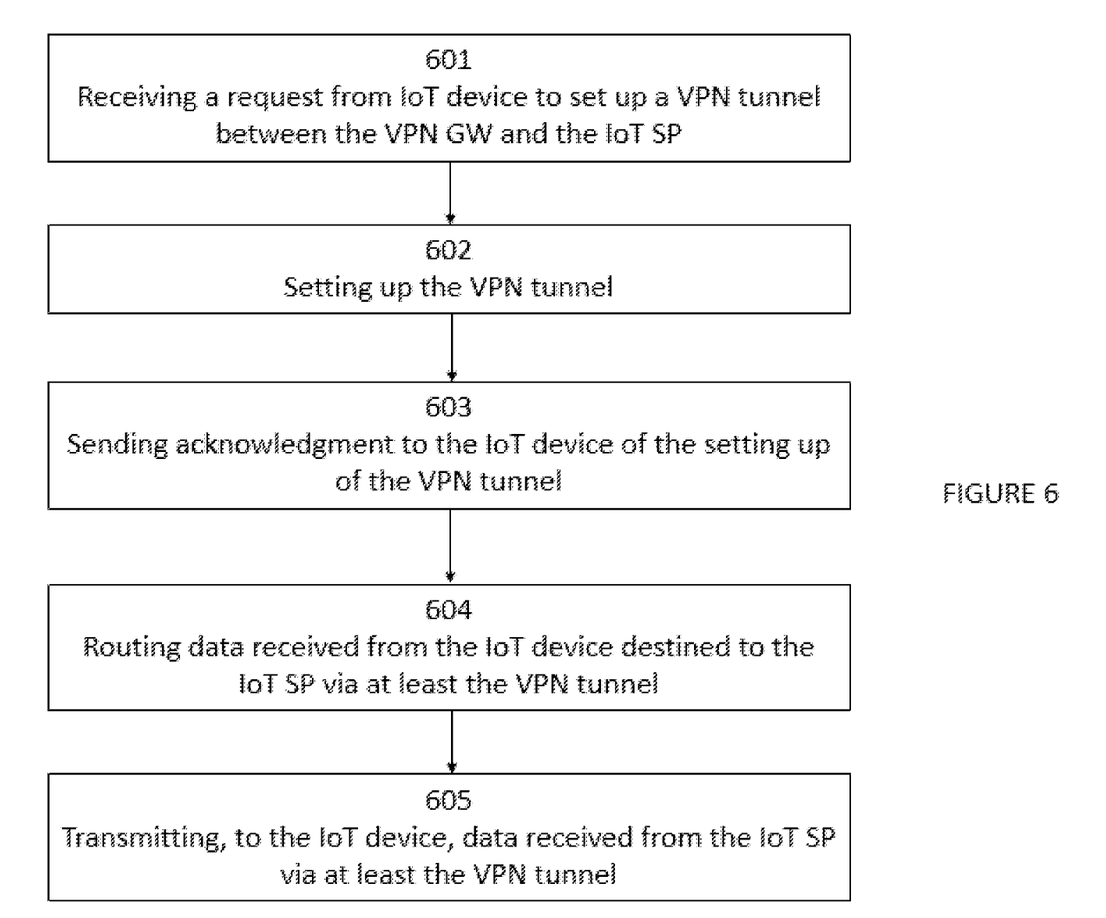
FIG. 6 illustrates a flowchart of a method performed by a network device (gateway) according to embodiments herein.

Referring to FIG. 6, there is depicted a flowchart of a method performed by network device or gateway device of a VPLMN to which an IoT device is roaming from a HPLMN, the method comprising:

(601) receiving a request from the IoT device to set up a VPN tunnel between the (VPN) gateway of the VPLMN and a (VPN) gateway of an IoT SP;

(602) setting up the VPN tunnel;

(603) sending an acknowledgement to the IoT device confirming the setting up of the VPN tunnel;

(604) routing data received from the IoT device destined to the IoT SP via at least the VPN tunnel; and (605) transmitting data, received from the IoT SP via the VPN tunnel, to the IoT device.

As previously described, the data routed via the VPN tunnel may further be tunneled over a GTP tunnel created between a serving GW of the VPLMN and a PGW or PDN GW of the HPLMN. In this case, the VPN tunnel ends up inside the GTP tunnel to further increase security. The network over which the GTP tunnel is created may be the Internet or the GRX/IPX network.

In order to tear down the VPN tunnel between the gateways, the VPN gateway of the VPLMN receives a de-attach request from the IoT device. This will tear down the VPN tunnel between the involved GWs.

Figure 7:
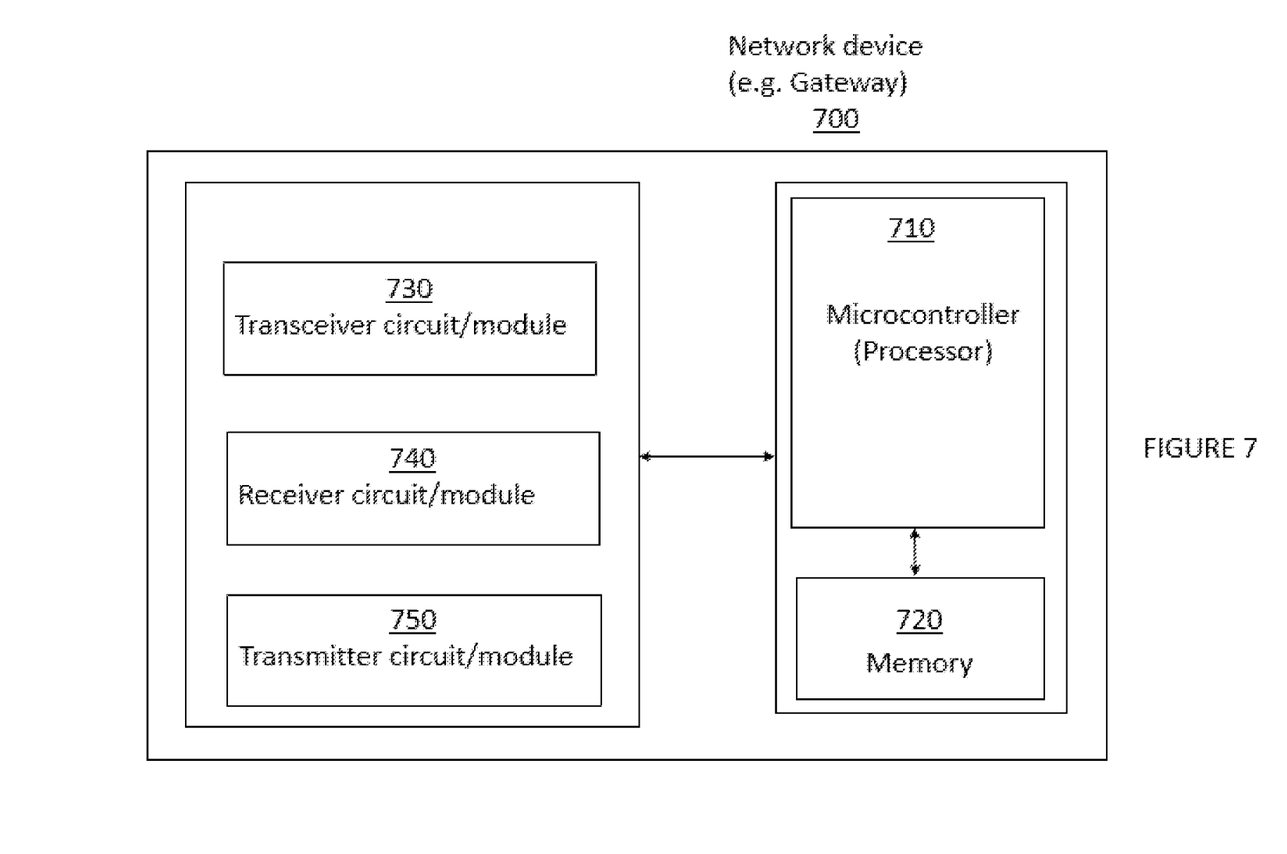
FIG. 7 illustrates a block diagram of a network device (gateway) according to embodiments herein.

Referring to FIG. 7, there is illustrated an exemplary block diagram of a network device (e.g., a gateway device) 700 configured to perform the method steps described above according to exemplary embodiments herein. The gateway device 700, in this scenario, belongs to a VPLMN to which an IoT device is roaming from a HPLMN. The gateway device may be a VPN gateway, a SGW or any network device capable in creating a VPN tunnel.

The network device 700 comprises a processing circuit or a processing module or a processor or microcontroller 710, a receiver circuit or receiver module 740; a transmitter circuit or transmitted module 750; a memory module 720 and a transceiver circuit or module 730 which may include the transmitter circuit 750 and the receiver circuit 740.

The processor 710 includes a microprocessor, an application specific integrated circuit (ASIC), field programmable gate array (FPGA), or the like. The processor 710 controls the operation of the network device 700 and its components. Memory module 720 includes a random access memory module (RAM), a read only memory (ROM), and/or any type of memory to store data and computer program instructions of a computer program that may be used by the processor 710. The execution of the program instructions adapts or configures the processor to carry out the operations of the network device 700 disclosed herein. Further, it should be appreciated that the network device 700 may comprise additional components not shown in FIG. 7.

The instructions contained in the memory module 720 are executable by the processor 710. The network device 700 is configured or operative to receive a request from the IoT device to set up a VPN tunnel between the network device 700 and a gateway of the IoT service provider. The network device 700 is configured to set up the VPN tunnel and to send an acknowledgement to the IoT device confirming the setting up of the VPN tunnel. The network device 700 is further configured to route data received from the IoT device destined to the IoT SP via at least the VPN tunnel. The network device 700 is further configured to transmit, to the IoT device, data received (if any) from the IoT SP via at least the VPN tunnel.

The data routed via the VPN tunnel may be tunneled over a GTP tunnel created between the SGW of the VPLMN and the PGW of the HPLMN.

There is also provided a computer program comprising instructions which when executed on at least one processor 710 of the gateway 700 according to embodiments herein, cause the at least one processor 710 to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of." Although specific terms may be employed herein, they are used in a generic and descriptive sense only and not for purposes of limitation. In particular, the embodiments herein may be applicable is any wired or wireless systems, including 3G, 4G, 5G, WiMax etc. Furthermore, the embodiments herein may also be applicable in non-3GPP LPWA networks such as Sigfox or LoRa.

The invention claimed is:

1. A method performed by an Internet-of-Things, IoT, device comprising a connectivity interface and not having sufficient computing power to encrypt or decrypt data the method comprising:
    roaming from a home network to a visited network, the home network and visited network having a pre-existing trust agreement so that the IoT device trusts the visited network,
    in response to entering the coverage area of the visited network, sending a request via the connectivity interface over the visited network to a Virtual Private Network, VPN Gateway comprised by a network device via the visited network,
    the request requesting the VPN Gateway to set up a Virtual Private Network, VPN tunnel over public internet between said network device and a gateway device of an IoT service provider;
    the IoT device not taking part in the creation or configuration of the VPN tunnel;
    receiving an acknowledgment from the network device, that the network device has set up the VPN tunnel;
    in response to the acknowledgement, setting up an IP connection with the IoT service provider;
    sending plaintext data to the VPN Gateway that encrypts the plaintext data and routes IP packets of the encrypted data via the VPN tunnel using Internet Protocol security, IPsec to the IoT service provider via the IP connection and
    receiving decrypted data from the VPN Gateway that generates the decrypted data by decrypting second encrypted data sent from the IoT service provider via the IP connection to the IoT device via the VPN tunnel using IPsec,
    wherein because the IoT device is not configured to encrypt or decrypt any data and does not having sufficient computing power to participate in a direct connection to the VPN tunnel, the VPN tunnel and IPSec are used by the VPN Gateway to encrypt the plaintext data received from the IoT device via the visited network before being sent over the public internet to the IoT service provider and to decrypt the second encrypted data coming from the IoT service provider into second plaintext data before sending the second plaintext data over the visited network to the IoT device.

2. The method according claim 1 wherein the data routed via the VPN tunnel is further tunneled over a GPRS Tunneling Protocol, GTP, tunnel created between a serving gateway, SGW, of the visited network and a packet data network gateway, PGW, of the home network.

3. A method performed by a VPN gateway of a network device of a visited network for communicating with an IoT device hot having sufficient computing power to encrypt or decrypt data, the method comprising:
    in response to the IOT device entering the coverage area of the visited network, receiving a request from the IoT device that is roaming from the home network to the visited network, the home network and visited network having a pre-existing trust agreement so that the IoT device trusts the visited network,
    the request from the IoT device requesting the VPN Gateway to set up a VPN tunnel over public internet between the network device and a gateway device of an IoT service provider,
    the IoT device not taking part in the creation or configuration of the VPN tunnel;
    setting up the VPN tunnel;
    sending an acknowledgment to the IoT device confirming the setting up of the VPN tunnel;
    receiving plaintext data from the IoT device transmitted over the visited network, the plaintext data intended for the IoT service provider;
    encrypting the plaintext data;
    routing the encrypted plaintext data to the IoT service provider via at least the VPN tunnel using Internet Protocol security, IPsec;
    receiving second encrypted data from the IOT service provider intended for the IoT device via the VPN tunnel using IPSec;
    decrypting the second encrypted data and transmitting the decrypted data to the IoT device using the visited network;

wherein because the IoT device is not configured to encrypt or decrypt any data and does not having sufficient computing power to participate in a direct connection to the VPN tunnel, the VPN tunnel and IPSec are used by the VPN Gateway to encrypt the plaintext data received from the IoT device via the visited network before being sent over the public internet to the IoT service provider and to decrypt the second encrypted data coming from the IoT service provider into second plaintext data before sending the second plaintext data over the visited network to the IoT device.

4. The method according to claim 3 wherein the data routed via the VPN tunnel is further tunneled over a GTP tunnel created between a SGW of the visited network and a PGW of the home network.

5. An Internet-of-Things, IoT, device not having sufficient computing power to encrypt or decrypt data, the IoT device comprising:
   a connectivity interface configured to:
      in response to entering the coverage area of a visited network, send a request to a Virtual Private Network, VPN Gateway of a network device via the visited network,
      the home network and the visited network having a pre-existing trust agreement so that the IoT device trusts the visited network,
      the request requesting the network device to set up a VPN tunnel between said network device and a gateway device of an IoT service provider over public internet,
      the IoT device not taking part in the creation or configuration of the VPN tunnel;
      receive an acknowledgment from the network device of the visited network,
      the acknowledgement indicating that the network device has set up the VPN tunnel;
      transmitting via the visited network, plaintext data to the VPN Gateway that encrypts the plaintext data and routes IP packets of the encrypted data via the VPN tunnel using Internet Protocol security, IPsec to the IoT service provider via an IP connection and,
      receiving via the visited network decrypted data from the VPN Gateway that generates the decrypted data by decrypting second encrypted data sent from the IoT service provider to the IoT device via the VPN tunnel using IPsec;
   and a processor configured to:
      roam from the home network to the visited network, and
      in response to the acknowledgement, set up the IP connection with the IoT service provider;
   wherein because the IoT device is not configured to encrypt or decrypt any data and does not having sufficient computing power to participate in a direct connection to the VPN tunnel, the VPN tunnel and IPSec are used by the VPN Gateway to encrypt the plaintext data received from the IoT device via the visited network before being sent over the public internet to the IoT service provider and to decrypt the second encrypted data coming from the IoT service provider into second plaintext data before sending the second plaintext data over the visited network to the IoT device.

6. The IoT device according to claim 5 wherein the data routed via the VPN tunnel is further tunneled over a GPRS Tunneling Protocol, GTP, tunnel created between a serving gateway, SGW, of the visited network and a packet data network gateway, PGW, of the home network.

7. A VPN gateway of a network device of a visited network for communicating with an IoT device not having sufficient computing rower to encrypt or decrypt data, the VPN gateway comprising:
   a transceiver module configured to receive, in response to the IOT device entering the coverage area of the visited network, a request from the IoT device that is roaming from the home network to the visited network, transmitted over the visited network,
   the home network and visited network having a pre-existing trust agreement so that the IoT device trusts the visited network,
   the request from the IoT device requesting the VPN Gateway to set up a VPN tunnel between the network device and a gateway device of an IoT service provider over public internet,
   the IoT device not taking part in the creation or configuration of the VPN tunnel;
   and a processor configured to-set up the VPN tunnel,
   the transceiver module further configured to:
      receive plaintext data from the IoT device transmitted over the visited network, the plaintext data intended for the IoT service provider,
      encrypt the plaintext data,
      route the encrypted plaintext data to the IoT service provider via at least the VPN tunnel using Internet Protocol security, IPsec,
      receive second encrypted data from the IOT service provider intended for the IoT device via the VPN runnel using IPsec, and
      decrypt the second encrypted data and transmit the decrypted data to the IoT device using the visited network;
   wherein because the IoT device is not configured to encrypt or decrypt any data and does not having sufficient computing power to participate in a direct connection to the VPN tunnel, the VPN tunnel and IPSec are used by the VPN Gateway to encrypt the plaintext data received from the IoT device via the visited network before being sent over the public internet to the IoT service provider and to decrypt the second encrypted data coming from the IoT service provider into second plaintext data before sending the second plaintext data over the visited network to the IoT device.

8. The network device according to claim 7 wherein the data routed via the VPN tunnel is further tunneled over a GTP tunnel created between a SGW of the visited network and a PGW of the home network.

9. The network device according to claim 7, wherein the network device is a VPN gateway of the visited network.

* * * * *